(12) United States Patent
Halder et al.

(10) Patent No.: US 8,755,966 B2
(45) Date of Patent: Jun. 17, 2014

(54) SYSTEM AND METHOD FOR CONTROLLING AUTONOMOUS MACHINE WITHIN LANE BOUNDARIES DURING POSITION UNCERTAINTY

(75) Inventors: Bibhrajit Halder, Peoria, IL (US); Ruchi Bhatia, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 135 days.

(21) Appl. No.: 13/438,167

(22) Filed: Apr. 3, 2012

(65) Prior Publication Data

US 2013/0261870 A1 Oct. 3, 2013

(51) Int. Cl.
*G05D 1/02* (2006.01)
(52) U.S. Cl.
USPC ............................................. 701/25; 701/50
(58) Field of Classification Search
USPC .................. 701/25–27, 400, 408–411, 50
See application file for complete search history.

(56) References Cited

U.S. PATENT DOCUMENTS

| | | | |
|---|---|---|---|
| 5,189,612 A * | 2/1993 | Lemercier et al. | 701/23 |
| 5,923,270 A | 7/1999 | Sampo et al. | |
| 6,393,362 B1 | 5/2002 | Burns | |
| 7,603,235 B2 | 10/2009 | Makela et al. | |
| 7,706,917 B1 * | 4/2010 | Chiappetta et al. | 700/245 |
| 7,711,464 B2 | 5/2010 | Kaufmann | |
| 8,126,642 B2 * | 2/2012 | Trepagnier et al. | 701/423 |
| 8,131,415 B2 | 3/2012 | Peake | |
| 8,280,623 B2 * | 10/2012 | Trepagnier et al. | 701/301 |
| 8,412,449 B2 * | 4/2013 | Trepagnier et al. | 701/301 |
| 8,447,440 B2 * | 5/2013 | Phillips et al. | 701/2 |
| 2002/0060267 A1 * | 5/2002 | Yavnai | 244/23 A |
| 2002/0099481 A1 | 7/2002 | Mori | |
| 2002/0143461 A1 | 10/2002 | Burns et al. | |
| 2010/0256835 A1 | 10/2010 | Mudalige | |
| 2010/0256836 A1 | 10/2010 | Mudalige | |

FOREIGN PATENT DOCUMENTS

WO 2011141619 11/2011

* cited by examiner

*Primary Examiner* — Yonel Beaulieu
(74) *Attorney, Agent, or Firm* — Liell & McNeil

(57) ABSTRACT

An autonomous machine control system includes a positioning unit measuring position and orientation, and a navigation unit storing a route plan including an intended travel path along a lane. The lane has a width defined by a left-hand boundary and a right-hand boundary. The navigation unit receives an uncertainty value associated with the position or orientation, and creates a virtual two-dimensional footprint based on an actual machine footprint and the uncertainty value. The navigation unit also simulates movement of the virtual footprint along the intended travel path, calculates a left-hand margin value defined by the virtual footprint and the left-hand boundary, and calculates a right-hand margin value defined by the virtual footprint and the right-hand boundary. The margin values are compared to a predetermined value, and speed or travel direction of the machine is controlled if either of the margin values is below the predetermined value.

16 Claims, 4 Drawing Sheets

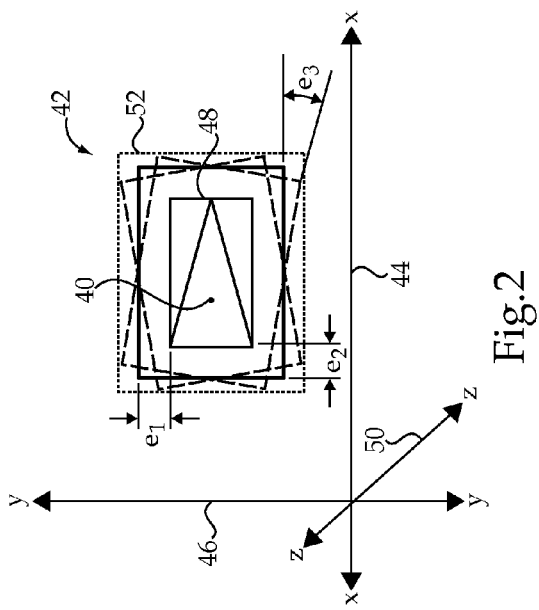
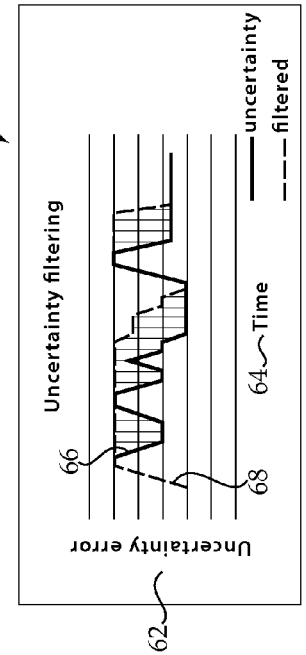
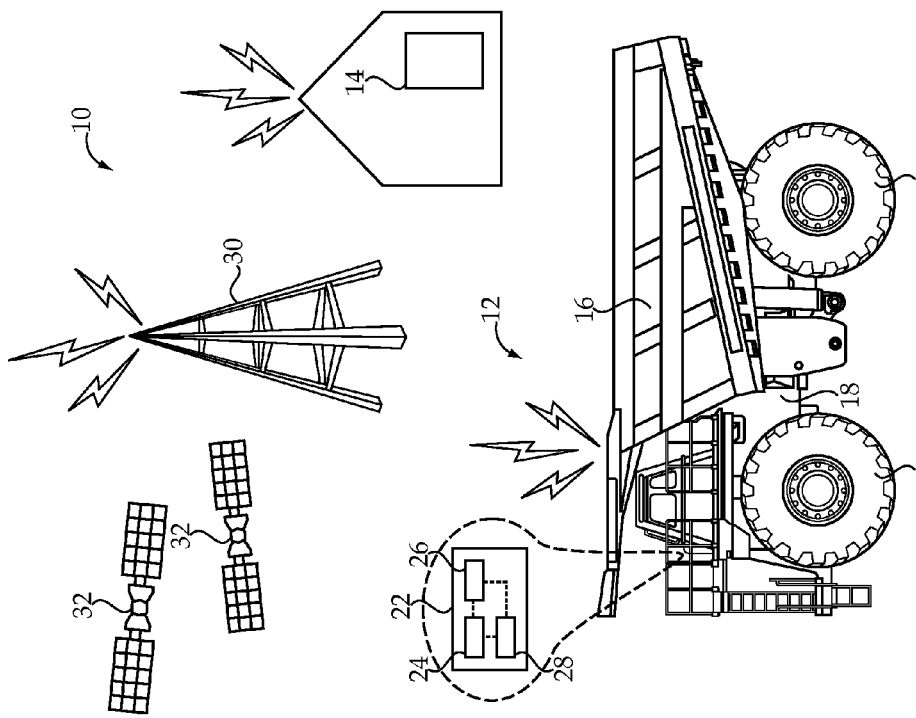

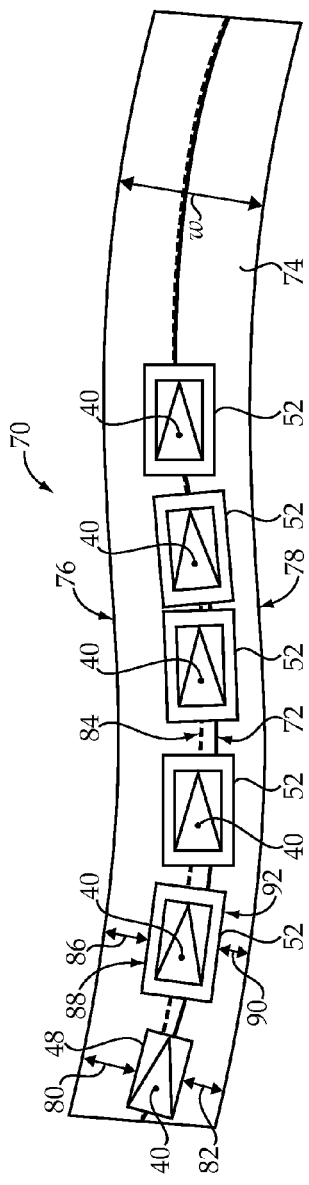
Fig.4
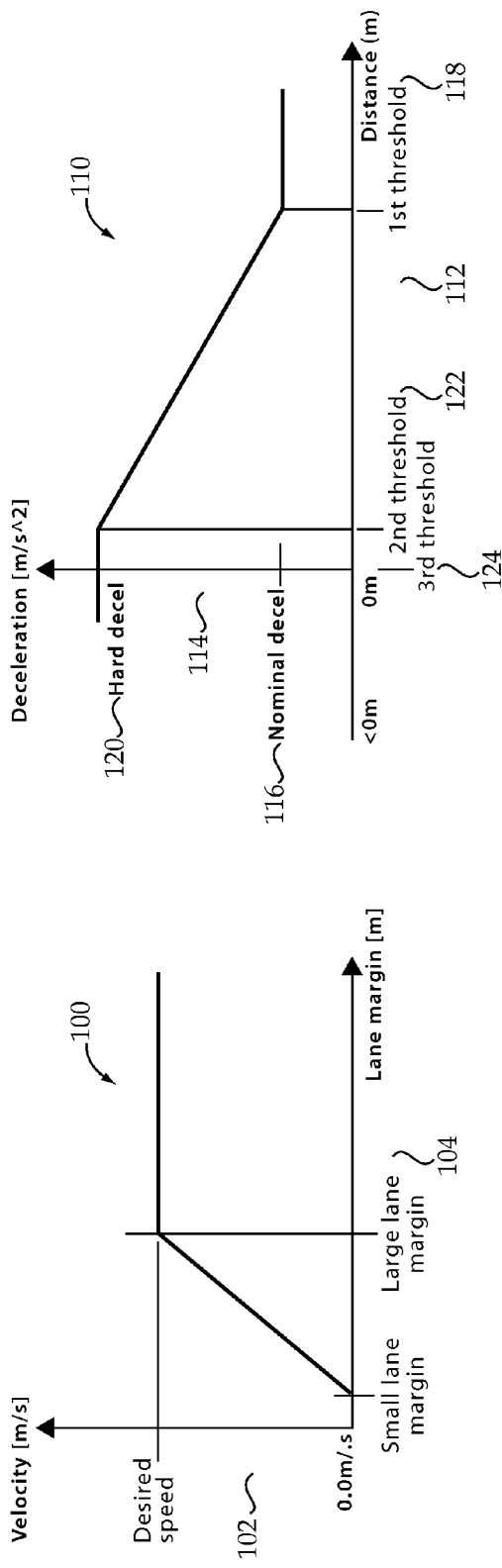
Fig.6
Fig.5

SYSTEM AND METHOD FOR CONTROLLING AUTONOMOUS MACHINE WITHIN LANE BOUNDARIES DURING POSITION UNCERTAINTY

TECHNICAL FIELD

The present disclosure relates generally to a control system for an autonomous machine, and more particularly to a control system for maintaining the autonomous machine within lane boundaries during position uncertainty.

BACKGROUND

Utilization of autonomous machines is becoming more prevalent and offers particular advantages in the mining industry. Specifically, autonomous machines may be operated in environments unsuitable for human operators, such as, for example, at high altitudes or in sparsely populated desert regions. In addition, autonomous machines may be operated for longer periods of time than manned machines, thus providing increased productivity, and may be operated according to strict control strategies aimed at optimizing efficiency and reducing emissions. Further, by optimizing operation, maintenance costs for the autonomous machine may potentially be reduced. Work sites, such as mines, utilizing autonomous machines may incorporate a fleet of autonomous machines with a variety of semi-autonomous and manned machines. Thus, safety and reliable control of the autonomous machines is of vital importance.

Autonomous control is accomplished by providing the autonomous machine with a machine control system that includes a positioning unit and a navigation unit. The navigation unit uses machine position and orientation information generated by the positioning unit to maneuver the autonomous machine according to a route plan, which includes, for example, designated paths, routes, and hazards. In particular, the navigation unit may electronically control speed and travel direction of the machine according to the route plan to accomplish a task. The route plan may be generated and updated by a central control system that is communicatively coupled with the autonomous machine. The central control system receives machine position information from all of the machines operating at the work site and transmits an updated route plan based on this position information to the autonomous machine. Thus, the reliability of the position and orientation information is one of the most critical components of successful autonomous machine control.

U.S. Pat. No. 6,393,362 to Burns teaches a strategy for autonomous vehicle collision avoidance. In particular, the strategy of Burns teaches the creation of a safety envelope corresponding to each of the autonomous vehicles that is based on the vehicle's geometry, speed, and guidance control errors and/or tolerances. Positions of the safety envelopes are predicted as each of the autonomous vehicles travel along a trajectory. If a potential overlap of safety envelopes of two or more vehicles is identified, a control strategy for one of the autonomous vehicles is modified to avoid the potential collision.

The present disclosure is directed to one or more of the problems or issues set forth above.

SUMMARY OF THE DISCLOSURE

In one aspect, a control system for an autonomous ground based machine includes a positioning unit configured to measure a position and an orientation of the machine. A navigation unit is in communication with the positioning unit and stores a route plan including an intended travel path along a lane. The lane has a width defined by a left-hand boundary and a right-hand boundary. The navigation unit is configured to receive an uncertainty value associated with at least one of the position and the orientation, and create a virtual two-dimensional footprint based on an actual footprint of the machine and the uncertainty value. The virtual two-dimensional footprint encompasses the actual footprint. The navigation unit is also configured to simulate movement of the virtual two-dimensional footprint along the intended travel path, calculate a left-hand margin value defined by the virtual two-dimensional footprint and the left-hand boundary, and calculate a right-hand margin value defined by the virtual two-dimensional footprint and the right-hand boundary. The left-hand margin value and the right-hand margin value are compared to a predetermined minimum lane margin value, and at least one of a speed and a travel direction of the machine are controlled if either of the left-hand margin value and the right-hand margin value is below the predetermined minimum lane margin value.

In another aspect, a method of controlling an autonomous ground based machine includes receiving an uncertainty value associated with at least one of a position and an orientation of the machine. A virtual two-dimensional footprint based on an actual footprint of the machine and the uncertainty value is calculated, and movement of the virtual two-dimensional footprint along an intended travel path is simulated. The intended travel path is over a lane having a width defined by a left-hand boundary and a right-hand boundary. The method also includes calculating a left-hand margin value defined by the virtual two-dimensional footprint and the left-hand boundary, and calculating a right-hand margin value defined by the virtual two-dimensional footprint and the right-hand boundary. The left-hand margin value and the right-hand margin value are compared to a predetermined minimum lane margin value, and at least one of speed and travel direction of the machine are controlled if either of the left-hand margin value and the right-hand margin value is below the predetermined minimum lane margin value.

BRIEF DESCRIPTION OF THE DRAWINGS

FIG. 1 is a schematic diagram of an exemplary control system for an autonomous machine, according to the present disclosure;

FIG. 2 is a schematic illustration of a virtual two-dimensional footprint of an autonomous machine based on an actual footprint of the machine and an uncertainty value, according to one aspect of the present disclosure;

FIG. 3 is a graph illustrating uncertainty error over time and depicting a filtering strategy, according to another aspect of the present disclosure;

FIG. 4 is a schematic view of a lane illustrating movement of the virtual two-dimensional footprint along an intended path, according to another aspect of the present disclosure;

FIG. 5 is a graph depicting lane margin value versus desired travel speed for the autonomous machine, according to another aspect of the present disclosure;

FIG. 6 is a graph depicting lane margin values versus deceleration rate for the autonomous machine, according to another aspect of the present disclosure;

DETAILED DESCRIPTION

Figure 7:
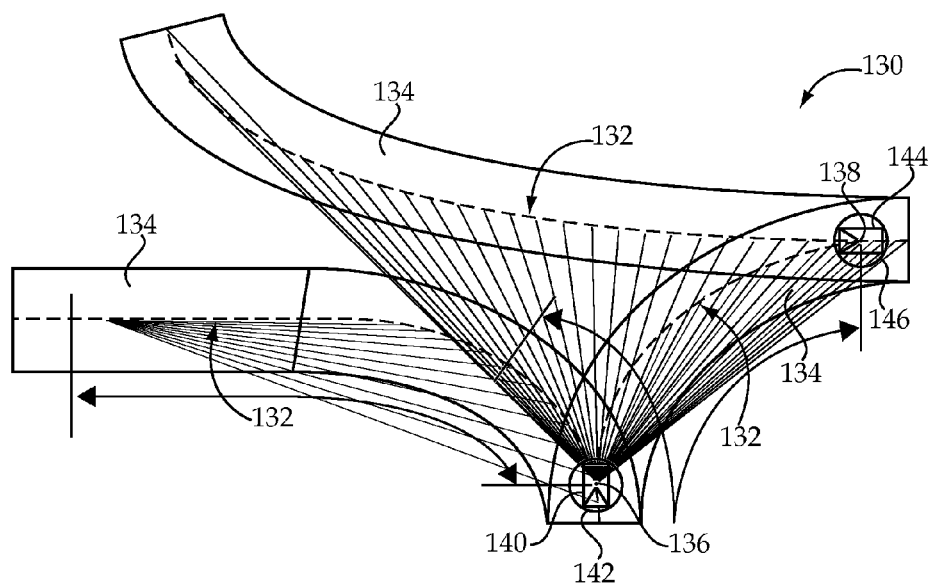
FIG. 7 is a schematic view of exemplary lanes illustrating spotting points and positions of virtual reference footprints relative to the respective spotting points, according to another aspect of the present disclosure.

As shown in FIG. 1, an exemplary control system 10 for a work site 12 includes a central control system 14 communicatively coupled with at least one autonomous machine 16 at the work site 12. According to a specific example, the work site 12 may be a mine environment utilizing heavy equipment, such as haulage vehicles, excavators, backhoes, front-end loaders, mining shovels, etc., to excavate and transport materials from a mine site, such as work site 12, to a production facility. The autonomous machine 16 is equipped for land, or ground, based travel and includes a chassis 18 supporting a plurality of ground engaging elements 20. Although the autonomous machine 16 is illustrated as a mining truck, or haulage vehicle, it should be appreciated that the control strategy provided herein is broadly applicable to a variety of machines utilized at a work site that incorporates any combination of autonomous, semi-autonomous, and manned machines.

The autonomous machine 16 may include a control system 22 supported on the chassis 18 and including an electronic controller 24, a positioning unit 26, and a navigation unit 28, or any number or combination of devices providing the functionality described herein. The electronic controller 24 is configured for drive-by-wire operation of the autonomous machine 16 and, thus, is in control communication with various components of the machine 16, including the positioning unit 26 and the navigation unit 28, to control at least the speed and direction of travel of the machine 16. As should be appreciated, the electronic controller 24 may also be in communication with various sensors and other devices in order to monitor and, thus, effectively control the autonomous operation of the machine 16.

Generally, the navigation unit 28 may receive, access, and/or store a route plan that is used to control operation of the autonomous machine 16. The central control system 14 may generate and/or update the route plan and transmit the route plan information to the autonomous machine 16 over a wireless network, such as via a wireless communication tower 30. According to one example, the route plan may include a terrain map of the work site 12 that includes positions of various materials, hazards, and equipment, including the autonomous machine 16, located at the work site 12. The route plan may also include an intended travel path, discussed below in greater detail, associated with a specific task for the autonomous machine 16.

The navigation unit 28 is in communication with the positioning unit 26, which may include one or more Global Positioning System (GPS) units receiving information from satellites 32 to calculate machine position information, which includes at least a position and an orientation of the autonomous machine 16. The navigation unit 28 may use the machine position information to establish a current location of the machine 16 and then determine how the machine 16 must be controlled, such as by controlling propulsion, steering, braking, and the like, to move the machine 16 along the intended travel path.

The electronic controller 24, the navigation unit 28, and the positioning unit 26 may each be of standard design and may include a processor, such as, for example, a central processing unit, a memory, and an input/output circuit that facilitates communication internal and external to the respective electronic device 24, 28, or 26. The processor may control operation of the respective electronic controller 24, navigation unit 28, or positioning unit 26 by executing operating instructions, such as, for example, computer readable program code stored in memory, wherein operations may be initiated internally or externally to the respective electronic device 24, 28, or 26. A control scheme may be utilized that monitors outputs of systems or devices, such as, for example, sensors, actuators, or control units, via the input/output circuit to control inputs to various other systems or devices.

The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the respective electronic controller 24, navigation unit 28, or positioning unit 26. One skilled in the art will appreciate that any computer based system or device utilizing similar components for controlling the components of the autonomous machine 16 is suitable for use with the present disclosure.

As should be appreciated, the autonomous machine 16 may include other systems and/or components necessary to effectively control the autonomous machine 16. For example, the autonomous machine 16 may also be equipped with inertial measurement devices, which tell the machine control system 22 how the machine 16 is moving. The machine control system 22 may also communicate with or include obstacle detection and avoidance features, including laser, vision, and radar sensors. All of these devices may be used in known ways to maneuver the autonomous machine 16 according to instructions provided in the route plan.

The machine position information may be two-dimensional or three-dimensional and, as stated above, may represent at least the position and orientation of the autonomous machine 16. For example, the POS LV system, provided by Applanix of Ontario, Canada, provides highly accurate position and orientation information and may be used by the machine control system 22. The machine position information may be translated into a reference point 40 on a coordinate system 42, as shown in FIG. 2. For example, the coordinate system 42 may include an x-axis 44 and a y-axis 46. A virtual reference footprint 48 corresponding to an actual footprint of the autonomous machine 16 is created to illustrate the position of the autonomous machine 16 on the coordinate system. In particular, the virtual reference footprint 48 represents the two-dimensional space occupied by the autonomous machine 16 on the coordinate system 42 in relation to the reference point 40, where the reference point 40 corresponds to a particular known location on the actual autonomous machine 16. Further, the orientation, or angular shifting, of the autonomous machine 16 in a plane parallel to the two-dimensional x-axis and y-axis is also shown using the virtual reference footprint 48. In particular, the virtual reference footprint 48 may illustrate rotation about a z-axis 50. The virtual reference footprint 48 may be used by the navigation unit 28 as described below and may be displayed on one or more graphical interfaces for observation by users, such as site managers at the work site 12.

Although the positioning unit 26 may provide highly continuous and accurate machine position information, there may be times when the machine position information is inaccurate or uncertain. Thus, the machine control system 24 may incorporate a device and/or strategy to monitor the accuracy and/or reliability of the machine position information. According to one example, the machine control system 24 may estimate a future position and/or orientation of the machine 16 at a future time, based on data regarding how the machine 16 is moving, and compare the estimation to the machine position information provided by the positioning unit 26 at the future time to arrive at an uncertainty value. It should be appreciated that a variety of different strategies may be used for assessing the inaccuracy and/or uncertainty of the machine position information and calculating an uncertainty value. According to a specific example, the uncertainty value may be provided in centimeters and, if machine position information certainty is continuously monitored, may be a parameter that is continuously available to the machine control system 24.

To account for this uncertainty with regard to the machine position information, the virtual reference footprint 48 may be expanded based on the uncertainty value. For example, a virtual two-dimensional footprint 52 may be created based on the virtual reference footprint 48, which corresponds to the actual footprint of machine 16, and the uncertainty value. The virtual two-dimensional footprint 52 may be an expansion of the virtual reference footprint 48 that accounts for error or uncertainty along the x-axis 44, such as position error $e_1$, and error or uncertainty along the y-axis 46, such as position error $e_2$. Further, the virtual two-dimensional footprint 52 may account for error or uncertainty with regard to rotation about the z-axis 50, such as represented by position error $e_3$. Thus, the virtual two-dimensional footprint 52 accounts for position and/or orientation uncertainty as indicated by the uncertainty value. According to a specific example, the uncertainty value may be multiplied by a 3 sigma multiplier and the resulting value may be used to create the virtual two-dimensional footprint 52. Such a strategy may provide a higher degree of confidence that the virtual two-dimensional footprint 52 completely encompasses the actual footprint of the autonomous machine 16, even when position uncertainty is indicated.

Turning now to FIG. 3, a graph 60 illustrating uncertainty error 62 over time 64 is shown. In particular, the control strategy disclosed herein may incorporate a strategy for filtering oscillations of the uncertainty value occurring over time. For example, an uncertainty value 66 may oscillate over time 64, as shown. This oscillation may result in undesirable oscillation of the virtual two-dimensional footprint 52 over time. For example, this oscillation may cause the virtual two-dimensional footprint 52 to change sizes very rapidly. Thus, to reduce these oscillations, a filtered uncertainty value 68, which represents the highest uncertainty value occurring over a period of time, may be used. Although a particular filtering strategy is shown, it should be appreciated that any desired filtering strategy may be incorporated into the presently disclosed control strategy.

A portion of an exemplary route plan 70 is shown generally in FIG. 4. In particular, the route plan 70 includes an intended travel path 72 for the autonomous machine 16 along a lane 74. The lane 74 has a width w defined by a left-hand boundary 76 and a right-hand boundary 78. It should be appreciated that the lane 74 may represent a road or path at the work site 12 along which the autonomous machine 16 travels. The boundaries 76 and 78 may represent predetermined constraints within which the machine 16 must travel. For example, restricting movement of the autonomous machine 16 within the boundaries 76 and 78 may reduce the risk of the autonomous machine 16 colliding with other machines, equipment, pedestrians, or other hazards.

The navigation unit 28 may be configured to simulate movement of the virtual reference footprint 48 along the intended travel path 72. The simulation may be utilized to evaluate movement of the virtual reference footprint 48, which represents the actual footprint of machine 16, relative to the boundaries 76 and 78 during conditions of position certainty. For example, a first left-hand margin value 80 defined by the virtual reference footprint 48 and the left-hand boundary 76 may be calculated, and a first right-hand margin value 82 defined by the virtual reference footprint 48 and the right-hand boundary 78 may be calculated. These margin values 80 and 82 may be compared to one or more thresholds, and the autonomous machine 16 may be controlled responsive to one of the margin values 80 and 82 falling below an evaluated threshold.

Under conditions of position uncertainty, such as when the uncertainty value is greater than zero, the navigation unit 28 may expand the virtual reference footprint 48 to account for the position uncertainty, as described above. Thus, when position uncertainty exists, the virtual two-dimensional footprint 52, rather than the virtual reference footprint 48, may be moved along the intended travel path 72. In particular, the simulated movement of the virtual two-dimensional footprint 52 may result in a simulated travel path 84, which may differ from the intended travel path 72. The navigation unit 28 may identify an updated left-hand margin value 86 defined by the virtual two-dimensional footprint 52 or, more specifically, a left-hand side 88 thereof, and the left-hand boundary 76. In addition, the navigation unit may identify an updated right-hand margin value 90 defined by the virtual two-dimensional footprint 52 or, more specifically, a right-hand side 92 thereof, and the right-hand boundary 78. These margin values 86 and 90 may be compared to one or more thresholds and the autonomous machine 16 may be responsively controlled if one of the margin values 86 and 90 is less than an evaluated threshold.

The navigation unit 28 may also be configured to identify a desired travel speed for the autonomous machine 16 based on the updated left-hand margin value 86 and the updated right-hand margin value 90. For example, the navigation unit 28 may select the smaller of the updated left-hand margin value 86 and the updated right-hand margin value 90, and may select a desired travel speed based on the width of the smaller of the margin values 86 and 90. As shown in graph 100 of FIG. 5 depicting velocity 102 versus lane margin 104, a slower travel speed may be desired if either of the margin values 86 and 90 is relatively small, while a faster travel speed, such as corresponding to a desired speed for the machine 16, may be desired if both of the margin values 86 and 90 are within acceptable ranges. As should be appreciated, the navigation unit 28 monitors the updated margin values 86 and 90, which have been updated to account for position uncertainty, to control the speed of the machine 16 to ensure the machine 16 operates within the boundaries 76 and 78.

As stated above, the navigation unit 28 may be configured to control speed and/or travel direction of the autonomous machine 16 if either of the updated left-hand margin value 86 and the updated right-hand margin value 90 is below a predetermined minimum lane margin value. Turning now to FIG. 6, a graph 110 of lane margin width 112 versus deceleration rate 114 is shown. In particular, the navigation unit 28 may be configured to decrease the speed of the machine 16 according to a minimal deceleration rate 116 if either of the updated left-hand margin value 86 and the updated right-hand margin value 90 is at or below a first lane margin threshold value 118. The navigation unit 28 may also be configured to decrease the speed of the machine 16 according to an aggressive deceleration rate 120 if either of the updated left-hand margin value 86 and the updated right-hand margin value 90 is at or below a second lane margin threshold value 122 that is less than the first lane margin threshold value 118. If either of the updated left-hand margin value 86 and the updated right-hand margin value 90 is below a third lane margin threshold 124, which may indicate that the machine 16 is at least partially outside of the lane 74, the navigation unit 28 may be configured to stop the machine 16. A stationary position of the machine 16 may be maintained until the position uncertainty decreases.

Turning now to FIG. 7, the navigation unit 28 may also be configured to simulate movement of the virtual two-dimensional footprint 52 relative to a spotting location. A spotting location may represent a desired location of the autonomous machine 16, such as for loading or unloading. A portion of an exemplary route plan 130 is shown including an intended travel path 132 for the autonomous machine 16 along lanes 134. In particular, the intended travel path 132 includes two spotting points 136 and 138. The navigation unit 28 may simulate movement of a first virtual reference footprint 140, which corresponds to the actual footprint of machine 16, relative to spotting point 136. During the simulation, the navigation unit 28 will monitor the uncertainty value and stop the machine 16 if the uncertainty value is greater than a spotting tolerance 142 of the spotting point 136. The navigation unit 28 may also simulate movement of a second virtual reference footprint 144 relative to spotting point 138. The navigation unit 28 will similarly monitor the uncertainty value and stop the machine 16 if the uncertainty value is greater than a spotting tolerance 146 of the spotting point 138.

Figure 8:
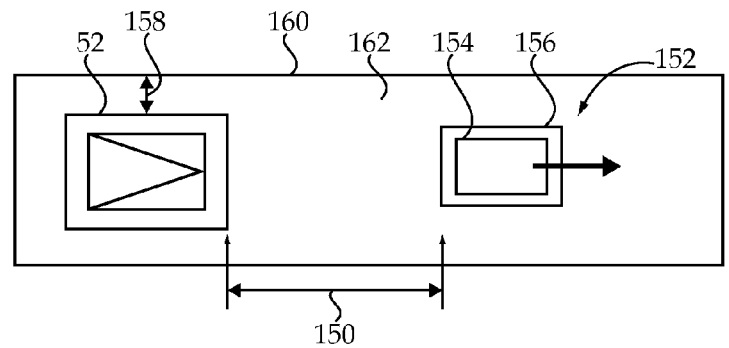
FIG. 8 is a schematic view of a lane illustrating a desired traveling distance between the virtual two-dimensional footprint and a non-stationary leading machine.

As shown in FIG. 8, the navigation unit 28 may also be configured to increase or decrease the speed of the autonomous machine 16 to maintain a desired traveling distance 150 between the machine 16 and a non-stationary leading machine 152. The desired traveling distance 150 may be based on the virtual two-dimensional footprint 52 described herein. The desired traveling distance 150 may also be based on a virtual reference footprint 154 of the leading machine 152 or a virtual two-dimensional footprint 156 that represents an expansion of the virtual reference footprint 154 to account for position uncertainty, as disclosed herein. According to some embodiments, the desired traveling distance 150 may be increased or decreased depending on a margin value 158 defined by a boundary 160 of a lane 162 and the virtual two-dimensional footprint 52.

Figure 9:
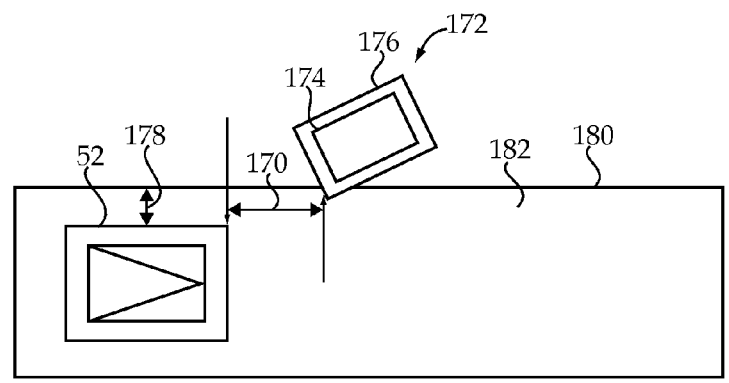
FIG. 9 is a schematic view of a lane illustrating a desired queuing distance between the virtual two-dimensional footprint and a stationary leading machine.

Turning now to FIG. 9, the navigation unit 28 may also be configured to increase or decrease the speed of the autonomous machine 16 to maintain a desired queuing distance 170 between the machine 16 and a stationary leading machine 172. The desired queuing distance 170 may be based on the virtual two-dimensional footprint 52 described herein. The desired queuing distance 170 may also be based on a virtual reference footprint 174 of the leading machine 172 or a virtual two-dimensional footprint 176 that, as stated above, represents an expansion of the virtual reference footprint 174 based on the uncertainty value. According to some embodiments, the desired queuing distance 170 may be increased or decreased depending on a margin value 178 defined by a boundary 180 of a lane 182 and the virtual two-dimensional footprint 52.

INDUSTRIAL APPLICABILITY

The present disclosure finds potential application in any control system for an autonomous machine operating at a work site. Further, the present disclosure may be specifically applicable to a control system for maintaining the autonomous machine within lane boundaries. Yet further, the disclosure may be applicable to control systems for maintaining the autonomous machine within lane boundaries during position uncertainty. Such work sites may include mining environments utilizing autonomous and manned heavy equipment, such as excavators, backhoes, front-end loaders, mining shovels, etc., to excavate and transport materials from a mine site to a production facility.

Referring generally to FIGS. 1-10, an exemplary control system 10 for a work site 12 includes a central control system 14 communicatively coupled with at least one autonomous machine 16 at the work site 12. The autonomous machine 16 may include a control system 22 supported on a chassis 18 and including an electronic controller 24, a positioning unit 26, and a navigation unit 28. The electronic controller 24 is configured for drive-by-wire operation of the autonomous machine 16 and, thus, is in control communication with various components of the machine 16, including the positioning unit 26 and the navigation unit 28, to control at least the speed and direction of travel of the machine 16. Generally, the navigation unit 28 may receive, access, and/or store a route plan, such as route plan 70, that is used to control operation of the autonomous machine 16.

The navigation unit 28 is in communication with the positioning unit 26, which may include one or more Global Positioning System (GPS) units receiving information from satellites 32 to calculate machine position information, which includes at least a position and an orientation of the autonomous machine 16. The navigation unit 28 may use the machine position information to establish a current location of the machine 16 and then determine how the machine 16 must be controlled, such as by controlling propulsion, steering, braking, and the like, to move the machine 16 along an intended travel path 72 of a lane 74, as indicated by the route plan 70. Although the positioning unit 26 may provide highly continuous and accurate machine position information, there may be times when the machine position information is inaccurate or uncertain. Thus, the machine control system 24 may incorporate a device and/or strategy to monitor the accuracy and/or reliability of the machine position information.

Figure 10:
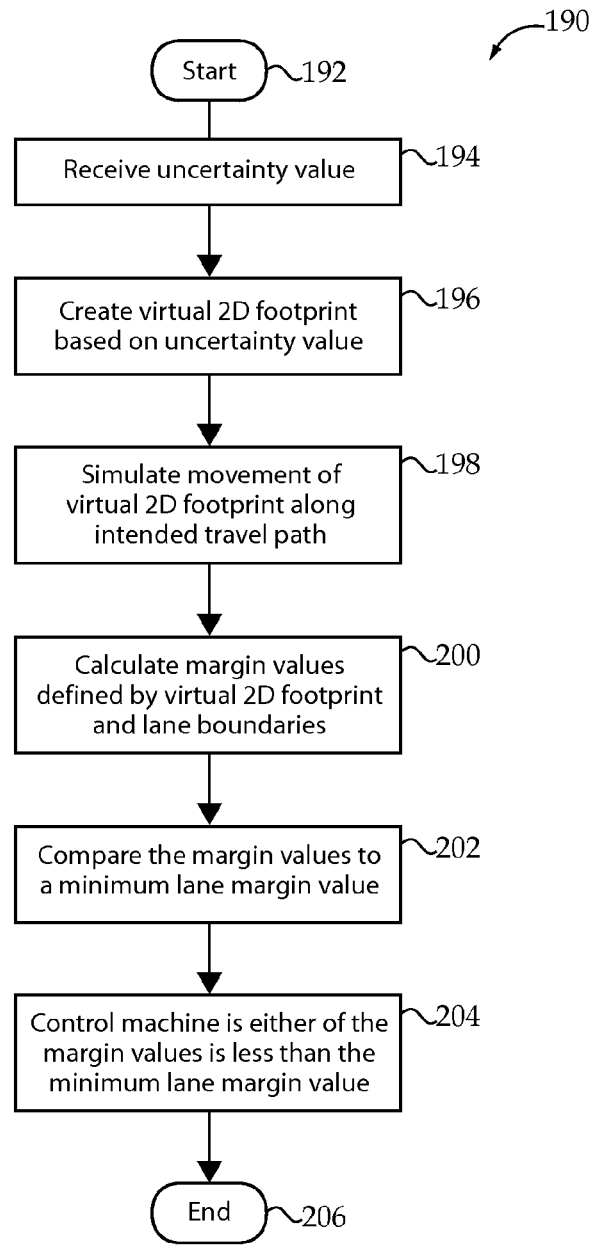
FIG. 10 is a flow chart representing exemplary steps of the control strategy described herein, according to another aspect of the present disclosure.

With specific reference to FIG. 10, there is shown a flow chart 190 representing an exemplary method for controlling the autonomous machine 16 within lane boundaries 76 and 78 of the lane 74 during conditions of position uncertainty. The method may be implemented by the machine control system 22 of the machine 16. According to one example, the steps implementing the disclosed method may be in the form of computer readable program code stored in a memory and executed by a processor of the navigation unit 28, or other computer usable medium. The method may run continuously or may be initiated in response to a predetermined event. For example, the algorithm may be initiated in response to an identification of position uncertainty.

The method begins at a START, Box 192. From Box 192, the method proceeds to Box 194, which includes the navigation unit 28 receiving an uncertainty value. According to one example, the machine control system 24 may estimate a future position and/or orientation of the machine 16 at a future time, based on data regarding how the machine 16 is moving, and compare the estimation to the machine position information provided by the positioning unit 26 at the future time to arrive at the uncertainty value. At Box 196, a virtual two-dimensional footprint 52 is created that accounts for position and/or orientation uncertainty as indicated by the uncertainty value. In particular, a virtual reference footprint 48, which corresponds to the actual footprint of the machine 16, may be expanded based on the uncertainty value to arrive at the virtual two-dimensional footprint 52.

At Box 198, the navigation unit 28 may simulate movement of the virtual two-dimensional footprint 52 along the intended travel path 72, as indicated by a route plan 70. The lane 74 has a width w defined by a left-hand boundary 76 and a right-hand boundary 78, and may represent a road or path at the work site 12 along which the autonomous machine 16 travels. Proceeding to Box 200, the navigation unit 28 may identify an updated left-hand margin value 86 defined by the virtual two-dimensional footprint 52 or, more specifically, a left-hand side 88 thereof, and the left-hand boundary 76. In addition, the navigation unit may identify an updated right-hand margin value 90 defined by the virtual two-dimensional footprint 52 or, more specifically, a right-hand side 92 thereof, and the right-hand boundary 78. These margin values 86 and 90 may be compared to one or more thresholds, at Box 202, and the autonomous machine 16 may be controlled if one of the margin values 86 and 90 is less than an evaluated threshold, as indicated at Box 204.

For example, the navigation unit 28 may be configured to decrease the speed of the machine 16 according to a minimal deceleration rate 116 if either of the updated left-hand margin value 86 and the updated right-hand margin value 90 is at or below a first lane margin threshold value 118. The navigation unit 28 may also be configured to decrease the speed of the machine 16 according to an aggressive deceleration rate 120 if either of the updated left-hand margin value 86 and the updated right-hand margin value 90 is at or below a second lane margin threshold value 122 that is less than the first lane margin threshold value 118. If either of the updated left-hand margin value 86 and the updated right-hand margin value 90 is below a third lane margin threshold 124, which may indicate that the machine 16 is at least partially outside of the lane 74, the navigation unit 28 may be configured to stop the machine 16. After the appropriate machine control has been executed, the method proceeds to an END, at Box 206.

The control strategy provided herein provides an effective means for controlling an autonomous machine, particularly with respect to lane boundaries, during conditions of position uncertainty. The reliability of machine position and orientation information is a critical component of successful autonomous machine control and, thus, it is important to identify conditions during which the machine position information is uncertain, and control the machine accordingly. In particular, the present control strategy provides a means for selecting or modifying a desired travel speed for the machine based on the position uncertainty, and initiating or controlling deceleration of the machine as the machine approaches lane boundaries based on the position uncertainty. As described herein, the uncertainty value may also be used in calculating traveling distance and queuing distance, and in determining whether precise positioning relative to a spotting location may be achieved. As such, the present control strategy provides a means for more precisely and safely controlling operation of the machine during conditions of position uncertainty.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A control system for an autonomous ground based machine, comprising:
   a positioning unit configured to measure a position and an orientation of the machine;
   a navigation unit in communication with the positioning unit and storing a route plan including an intended travel path along a lane, wherein the lane has a width defined by a left-hand boundary and a right-hand boundary, the navigation unit configured to:
   receive an uncertainty value associated with at least one of the position and the orientation;
   create a virtual two-dimensional footprint based on an actual footprint of the machine and the uncertainty value, wherein the virtual two-dimensional footprint encompasses the actual footprint;
   simulate movement of the virtual two-dimensional footprint along the intended travel path;
   calculate a left-hand margin value defined by the virtual two-dimensional footprint and the left-hand boundary, and a right-hand margin value defined by the virtual two-dimensional footprint and the right-hand boundary;
   compare the left-hand margin value and the right-hand margin value to a predetermined minimum lane margin value; and
   control at least one of a speed and a travel direction of the machine if either of the left-hand margin value and the right-hand margin value is below the predetermined minimum lane margin value.

2. The control system of claim 1, wherein the navigation unit is further configured to identify a desired travel speed based on a smaller value of the left-hand margin value and the right-hand margin value, and increase or decrease the speed of the machine toward the desired travel speed.

3. The control system of claim 1, wherein the navigation unit is further configured to decrease the speed of the machine according to a minimal deceleration rate if either of the left-hand margin value and the right-hand margin value is below a first lane margin threshold value.

4. The control system of claim 3, wherein the navigation unit is further configured to decrease the speed of the machine according to an aggressive deceleration rate if either of the left-hand margin value and the right-hand margin value is below a second lane margin threshold value, wherein the second lane margin threshold value is less than the first lane margin threshold value, wherein the aggressive deceleration rate is greater than the minimal deceleration rate.

5. The control system of claim 4, wherein the navigation unit is further configured to stop the machine if either of the left-hand margin value and the right-hand margin value is below a third lane margin threshold value, wherein the third lane margin threshold value is less than the second lane margin threshold value.

6. The control system of claim 1, wherein the navigation unit is further configured to increase or decrease the speed of the machine to maintain a desired traveling distance between the machine and a non-stationary leading machine, wherein the desired traveling distance is based on the virtual two-dimensional footprint.

7. The control system of claim 1, wherein the navigation unit is further configured to increase or decrease the speed of the machine to maintain a desired queuing distance between the machine and a stationary leading machine, wherein the desired queuing distance is based on the virtual two-dimensional footprint.

8. The control system of claim 1, wherein the navigation unit is further configured to:
   create a virtual reference footprint based on the actual footprint of the machine;

simulate movement of the virtual reference footprint relative to a spotting point; and stop the machine if the uncertainty value is greater than a spotting tolerance of the spotting point.

9. A method of controlling an autonomous ground based machine, the machine including a positioning unit configured to measure a position and an orientation of the machine, and a navigation unit in communication with the positioning unit and storing a route plan including an intended travel path along a lane, wherein the lane has a width defined by a left-hand boundary and a right-hand boundary, the method comprising steps of:

receiving an uncertainty value associated with at least one of the position and the orientation;

creating a virtual two-dimensional footprint based on an actual footprint of the machine and the uncertainty value, wherein the virtual two-dimensional footprint encompasses the actual footprint;

simulating movement of the virtual two-dimensional footprint along the intended travel path;

calculating a left-hand margin value defined by the virtual two-dimensional footprint and the left-hand boundary, and a right-hand margin value defined by the virtual two-dimensional footprint and the right-hand boundary;

comparing the left-hand margin value and the right-hand margin value to a predetermined minimum lane margin value; and controlling at least one of speed and travel direction of the machine if either of the left-hand margin value and the right-hand margin value is below the predetermined minimum lane margin value.

10. The method of claim 9, further including:

identifying a desired travel speed based on a smaller value of the left-hand margin value and the right-hand margin value; and increasing or decreasing the speed of the machine toward the desired travel speed.

11. The method of claim 9, further including decreasing the speed of the machine according to a minimal deceleration rate if either of the left-hand margin value and the right-hand margin value is below a first lane margin threshold value.

12. The method of claim 11, further including decreasing the speed of the machine according to an aggressive deceleration rate if either of the left-hand margin value and the right-hand margin value is below a second lane margin threshold value, wherein the second lane margin threshold value is less than the first lane margin threshold value, wherein the aggressive deceleration rate is greater than the minimal deceleration rate.

13. The method of claim 12, further including stopping the machine if either of the left-hand margin value and the right-hand margin value is below a third lane margin threshold value, wherein the third lane margin threshold value is less than the second lane margin threshold value.

14. The method of claim 9, further including increasing or decreasing the speed of the machine to maintain a desired traveling distance between the machine and a non-stationary leading machine, wherein the desired traveling distance is based on the virtual two-dimensional footprint.

15. The method of claim 9, further including increasing or decreasing the speed of the machine to maintain a desired queuing distance between the machine and a stationary leading machine, wherein the desired queuing distance is based on the virtual two-dimensional footprint.

16. The method of claim 9, further including:

creating a virtual reference footprint based on the actual footprint of the machine;

simulating movement of the virtual reference footprint relative to a spotting point; and stopping the machine if the uncertainty value is greater than a spotting tolerance of the spotting point.

* * * * *